United States Patent [19]

Xue et al.

[11] Patent Number: 5,698,340
[45] Date of Patent: Dec. 16, 1997

[54] CARBONACEOUS INSERTION COMPOUNDS AND USE AS ANODES IN RECHARGEABLE BATTERIES

[75] Inventors: Jiayu Simon Xue, Coquitlam; Jeffery Raymond Dahn, Surrey, both of Canada

[73] Assignee: Moli Energy (1990) Limited, Canada

[21] Appl. No.: 665,993

[22] Filed: Jun. 19, 1996

Related U.S. Application Data

[63] Continuation of Ser. No. 428,330, Apr. 25, 1995, abandoned.

[30] Foreign Application Priority Data

Mar. 3, 1995 [CA] Canada ................................ 2144037

[51] Int. Cl.⁶ ........................................................ H01M 4/02
[52] U.S. Cl. .................................................. 429/218; 423/594
[58] Field of Search ................................... 429/218, 213, 429/194; 423/594

[56] References Cited

U.S. PATENT DOCUMENTS

| 4,119,655 | 10/1978 | Hulme . |
| 5,130,211 | 7/1992 | Wilkinson et al. . |
| 5,286,582 | 2/1994 | Tahara et al. ............................ 429/218 |

FOREIGN PATENT DOCUMENTS

| 2098248 | 6/1993 | Canada . |
| 486950A1 | 11/1991 | European Pat. Off. . |
| 0 593 785 | 4/1994 | European Pat. Off. . |
| 0 685 896 | 12/1995 | European Pat. Off. . |
| 03/245458 | 2/1990 | Japan . |

OTHER PUBLICATIONS

J.R. Dahn, et al., "Carbons and Graphites as Substitutes for the Lithium Anode", from Lithium Batteries—New Materials, Developments and Perspectives, ed. G. Pistoia, Elsevier (1990) month N/A.

J. Yamaura, "High voltage, rechargeable lithium batteries using newly-developed carbon for negative electrode material", Journal of Power Sources, 43–44 (1993) pp. 233–239 (month N/A).

K. Sato, et al., "A Mechanism of Lithium Storage in Disordered Carbons", Science, vol. 264, Apr. 22, 1994, pp. 556–558.

A. Mabuchi, et al., "Charge–Discharge Characteristics of the Mesocarbon Microbeads Heat–Treated at Different Temperatures", 7th International Meeting on Lithium Batteries, Extended Abstracts p. 212, Boston, Mass. (1994) (month N/A).

G.T. Burns, et al., "High–Temperature Chemistry of the Conversion of Siloxanes to Silicon Carbide", Chem. Mater. 1992, 4, pp. 1313–1323 (month N/A).

F. Babonneau, et al., "Silicon Oxycarbide Glasses from Sol–Gel Precursors", Mat. Res. Soc. Symp. Proc. vol. 271 (1992), pp. 789–793 (month N/A).

Primary Examiner—M. Nuzzolillo
Attorney, Agent, or Firm—Lerner, David, Littenberg, Krumholz & Mentlik

[57] ABSTRACT

Carbonaceous insertion compounds and methods for preparation are described wherein the compounds comprise silicon and oxygen and are characterized by x-ray diffraction patterns that resemble that of amorphous silicon dioxide. The compounds can exhibit a large reversible capacity for lithium and can be prepared by simple pyrolysis of suitable polymer/s containing silicon, oxygen and carbon at an appropriate temperature. These insertion compounds may be suitable for use as high capacity anodes in lithium ion batteries.

39 Claims, 8 Drawing Sheets

CARBONACEOUS INSERTION COMPOUNDS AND USE AS ANODES IN RECHARGEABLE BATTERIES

This is a continuation of application Ser. No. 08/428,330 filed Apr. 25, 1995, now abandoned.

FIELD OF THE INVENTION

The invention pertains to the field of carbonaceous materials and, in particular, to amorphous silicon and oxygen containing carbonaceous (Si-C-O) insertion materials. Additionally, the invention pertains to the field of rechargeable batteries and, in particular, to rechargeable batteries comprising Si-C-O anode materials.

BACKGROUND OF THE INVENTION

Carbonaceous compounds have been of great interest lately for use as anode materials in what is called lithium-ion or rocking chair type batteries. These batteries represent the state of the art in small rechargeable power sources for commercial electronics applications. Typically, these batteries have about twice the energy density (Wh/L) of conventional rechargeable systems (such as NiCd or lead acid batteries). Additionally, lithium ion batteries operate around 3½ volts which is often sufficiently high such that a single cell can suffice for many electronics applications.

Lithium ion batteries use two different insertion compounds for the active cathode and anode materials. Insertion compounds are those that act as a host solid for the reversible insertion of guest atoms (in this case, lithium atoms). The structure of the insertion compound host is not significantly altered by the insertion. In a lithium ion battery, lithium is extracted from the anode material while lithium is concurrently inserted into the cathode on discharge of the battery. The reverse processes occur on recharge of the battery. Lithium atoms travel or "rock" from one electrode to the other as ions dissolved in a non-aqueous electrolyte with associated electrons travelling in the circuit external to the battery.

The two electrode materials for lithium ion batteries are chosen such that the chemical potential of the inserted lithium within each material differs by about 3 to 4 electron volts thus leading to a 3 to 4 volt battery. It is also important to select insertion compounds that reversibly insert lithium over a wide stoichiometry range thus leading to a high capacity battery.

A 3.6 V lithium ion battery based on a $LiCoO_2$/pre-graphitic carbon electrochemistry is commercially available (produced by Sony Energy Tec.) wherein the carbonaceous anode can reversibly insert about 0.65 Li per six carbon atoms. (The pre-graphitic carbon employed is a disordered form of carbon which appears to be similar to coke.) However, the reversible capacity of lithium ion battery anodes can be increased by using a variety of alternatives mentioned in the literature. For example, the crystal structure of the carbonaceous material affects its ability to reversibly insert lithium (as described in J. R. Dahn et al., "Lithium Batteries, New Materials and New Perspectives", edited by G. Pistoia, Elsevier North-Holland, p1–47, (1993)). Graphite for instance can reversibly incorporate one lithium per six carbon atoms, which corresponds electrochemically to 372 mAh/g. This electrochemical capacity per unit weight of material is denoted as the specific capacity for that material. Graphitized carbons and/or graphite itself can be employed under certain conditions (as for example in the presentation by Matsushita, 6th International Lithium Battery Conference, Muenster, Germany, May 13, 1992, or in U.S. Pat. No. 5,130,211).

Other alternatives for increasing the specific capacity of carbonaceous anode materials have included the addition of other elements to the carbonaceous compound. For example, European Patent Application No. EP486950 and Japanese Application Laid-Open No. 03-245458 mention the addition of small amounts of phosphorous and boron respectively to enhance the anode specific capacity. The mechanism behind this effect is unclear but it may be a result of modifications to the microstructure of the carbonaceous compound. Also, Canadian Application Serial No. 2,098,248 discloses a means for enhancing anode capacity by substituting electron acceptors (such as boron, aluminum, and the like) for carbon atoms in the structure of the carbonaceous compound.

Recently, other carbonaceous materials have been prepared with very high reversible capacity by pyrolysis of suitable starting materials. K. Sato et al. in Science 264, 556, (1994) disclosed a carbonaceous material prepared by heating polyparaphenylene at 700° C. which has a reversible capacity of 680 mAh/g. At the Seventh International Meeting on Lithium Batteries, Extended Abstracts Page 212, Boston, Mass. (1994), A. Mabuchi et al. disclosed a low density (about 1.5 g/cc) carbonaceous material prepared by heating coal tar pitch at 700° C. which has a reversible capacity of about 750 mAh/g. These values are much greater than that of pure graphite. However, both materials have a very large irreversible capacity as evidenced by first discharge capacities of over 1000 mAh/g for the former and about 1200 mAh/g for the latter. Both materials also are crystalline enough to exhibit x-ray patterns from which the parameters $d_{002}$, $L_c$, a, and $L_a$ can be determined. Neither material therefore incorporates additional elements (such as electron acceptors) and neither material is amorphous based on x-ray diffraction. It is unknown yet why these carbonaceous materials exhibit such high capacity.

Co-pending Canadian Patent Application Serial No. 2,127,621 titled 'Carbonaceous Insertion Compounds and Use as Anodes in Rechargeable Batteries' filed Jul. 8, 1994 discloses carbonaceous insertion compounds that are pre-graphitic (ie. having a disordered graphite structure) and that comprise atoms of an element capable of alloying with alkali metal atoms. Silicon, in particular, is an element capable of alloying with a substantial amount of lithium. Certain compounds of this invention are attractive for use as anode materials in lithium ion batteries. Examples of specific pre-graphitic carbonaceous compounds containing both silicon and oxygen were presented that exhibited large reversible capacity for lithium. The stoichiometry of these example compounds could be represented by the formula $Li_xSi_yC_{1-y}O_n$ wherein x is greater than 0, y is greater than 0 and less than about 0.3, the ratio z/y is greater than zero and less than or equal to about 1.5, and n is less than about 0.3.

The pre-graphitic Si-C-O example compounds in the aforementioned Canadian patent application were prepared in part by pyrolyzing certain polymer precursors comprising silicon and oxygen. It was expected that similar results could be obtained by pyrolysis of mixtures of other stoichiometrically similar polymer precursors.

Amorphous or glassy Si-C-O compounds are known to exist in the art. Some structural and stoichiometry information is known. Such compounds can be prepared by pyrolyzing certain polymers that contain silicon, oxygen, and carbon. Generally, oxygen is retained in the pyrolyzed product at pyrolysis temperatures about 1000° C. Oxygen is typically lost above about 1300° C. in the form of carbon-oxide gases. For instance, G. T. Burns et al., Chem. Mater. 1992, 4, 1313–1323, prepared a variety of $Si_yC_{1-y}O_z$ compounds wherein y and z are numbers in a range similar to that in the aforementioned co-pending Canadian patent application. The goal of Burns et al. was to find new methods of preparing SiC. The amorphous compounds were prepared by pyrolyzing siloxane polymers (polymers comprising silicon and oxygen). Based on X-ray diffraction measurements, the Si-C-O compounds were described as being amorphous, with no apparent resemblance to graphite. The possibility that such compounds could serve as hosts for insertion was not mentioned.

In 'Silicon Oxycarbide Glasses from Sol-Gel Precursors', Mat. Res. Soc. Symp. Proc. Vol. 271, 1992, F. Babonneau et al. also discuss Si-C-O 'black glasses' prepared from polymeric precursors. C/Si ratios as low as 0.11 were measured (corresponding to y=0.9). In certain instances, the presence of two phases, an oxycarbide phase (comprising Si, C, and O) and a free carbon phase (C only), was discussed therein.

SUMMARY OF THE INVENTION

The subject matter of the invention includes novel carbonaceous insertion compounds containing Si and O, methods of preparing said novel compounds, and the use of said novel compounds as electrode materials in electrochemical devices in general.

The novel Si-C-O insertion compounds have the formula $A_xSi_yC_{1-y}O_z$ wherein A is an alkali metal inserted in the $A_xSi_yC_{1-y}O_z$. In said formula, x,y, and z are numbers wherein x is greater than zero, y is in the range from greater than zero to less than 1, and the ratio z/y is greater than zero and less than about 4. The x-ray diffraction pattern of the insertion compounds resembles amorphous $SiO_2$.

Specific carbonaceous insertion compounds can be prepared wherein the inserted alkali metal A is Li. Additionally, y can be greater than about 0.2 and the ratio y/z can be about 1.7.

A general process for preparing the compounds of the invention comprises the following steps: providing a polymeric precursor for pyrolysis, the precursor having the formula $H_nSi_{y'}C_{1-y'}O_{z'}$ wherein n, y', and z' are numbers, y' is in the range from greater than zero to less than 1, and n and z' are greater than zero; pyrolyzing the polymeric precursor at a temperature above the decomposition temperature of the precursor and below the minimum of the temperatures for forming SiC or $SiO_2$ from the pyrolyzed polymeric precursor; and inserting atoms of A into the pyrolyzed polymeric precursor.

It can be advantageous to use in the process a polymeric precursor that has been extensively cross-linked. Thus, a mixture of a first silicon containing polymer and a hardener can be used as the polymeric precursor and the process can additionally comprise a hardening of the polymeric precursor before pyrolyzing. It may be useful for said mixture to also comprise a second polymer (eg. for purposes of adjusting stoichiometry). In such a case, the first and second polymers can comprise epoxy functional groups capable of being cross-linked. As a specific example, the first silicon containing polymer can be 3-glycidoxypropyltrimethoxysilane and the second polymer can be epoxy novolac resin.

The hardener can amount to about 17% by weight of the total weight of the polymeric precursor. Preferred hardeners can be selected from the group consisting of 4-aminobenzoic acid and hexamethylenediamine. Other suitable hardeners can be selected from the group consisting of phthalic anhydride, m-phenylenediamine, and N-benzylmethylamine. When using a preferred hardener, the hardening step can be performed at a temperature of about 90° C. for about an hour and then at a temperature of about 170° C. for about two hours. When using one of the other suitable hardeners, the hardening step can be performed in a similar manner except it can be advantageous to extend the treatment at about 170° C. for up to about twenty hours.

The pyrolysis is performed at a temperature above the decomposition temperature of the polymer and below a temperature that results in the formation of undesirable compounds, such as silicon carbide. The temperature for such formation may be dependent on the polymeric precursor used and thus varies accordingly. In certain instances, a suitable temperature for the pyrolysis step is about 1000° C. and the pyrolysis can be performed in about one hour. Additionally, before pyrolyzing it may be advantageous to grind the hardened polymer precursor into a dispersible fine powder form.

The pyrolyzed product of the aforementioned processes may have no alkali metal inserted as prepared. However, alkali metal atoms A as defined above can be inserted thereafter via conventional chemical or electrochemical means.

Thus, carbonaceous insertion compounds of the invention can be prepared by the aforementioned general or specific processes. After pyrolysis, the decomposed polymeric precursor can be characterized in part by the energy level of its associated $Si-L_{23}VV$ Auger line which is positioned intermediate between 75 and 91 eV. In particular, the energy level of the $Si-L_{23}VV$ Auger line can be about 81 eV. This energy level may be expected to shift however after inserting the alkali metal A into the host.

Electrochemical devices of the invention comprise an electrode wherein a portion of the electrode comprises a carbonaceous insertion compound $A_xSi_yC_{1-y}O_z$ of the invention as defined. The device can be a battery and, in particular, can be a non-aqueous battery comprising: a cathode comprising a lithium insertion compound; a non-aqueous electrolyte comprising a lithium salt dissolved in a mixture of non-aqueous solvents; and an anode comprising the carbonaceous insertion compound of the invention wherein the alkali metal A is Li.

DETAILED DESCRIPTION OF THE SPECIFIC EMBODIMENTS OF THE INVENTION

Figure 1:
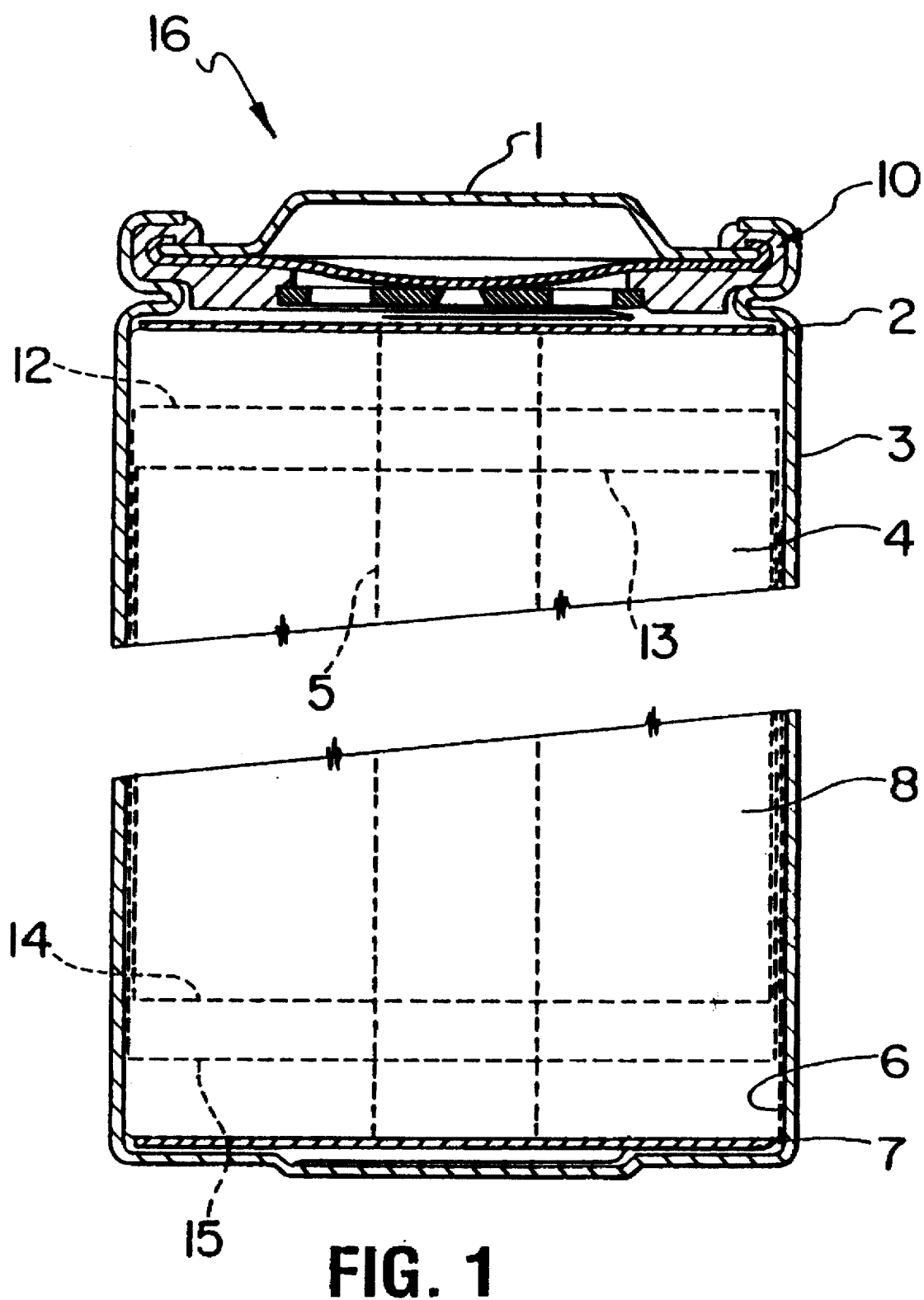
FIG. 1 shows a cross-sectional view of a conventional lithium ion spiral-wound type battery.

The novel carbonaceous insertion compounds of the invention comprise a host made of silicon, oxygen, and carbon that is almost amorphous based on x-ray diffraction analysis. Alkali metals in general might be reversibly inserted into the host. In particular, lithium can be reversibly inserted therein. Depending on the method of synthesis, an appreciable amount of hydrogen may also be present. The composition range of such compounds denoted as $A_xSi_yC_{1-y}O_z$, wherein A is an inserted alkali metal, covers values of x, y, and z wherein x is greater than zero, y is in the range from greater than zero to less than about 0.3, and the ratio z/y is greater than zero and less than about 4 (the maximum number of oxygen atoms that can bond to a Si atom).

The structure of the carbonaceous insertion compounds of the invention is such that its associated x-ray diffraction pattern resembles amorphous $SiO_2$. The instant compounds are therefore different to some extent from the compounds described in the aforementioned co-pending Canadian patent application serial no. 2,127,621, whose associated x-ray diffraction pattern resembles a disordered graphite. Additionally, as shown in the Examples to follow, the electrochemical properties of the instant compounds can also show subtle differences. Otherwise, it is difficult to distinguish between the two types of compounds.

Without wishing to be bound by theory, adversely or otherwise, the inventors offer the following theoretical model to distinguish the two types of compounds structurally. The instant insertion compounds might be called network glasses wherein Si atoms are bonded to carbon and to oxygen atoms, but not to other silicon atoms. The carbon atoms would appear predominantly in $sp^3$ bonded configurations, and there would be no clear regions of carbon atoms in $sp^2$ (graphene-type) bonded configurations. On the other hand, the pre-graphitic insertion compounds of the aforementioned Canadian patent application Serial No. 2,127,621 would be expected to have clear regions of carbon atoms forming small graphene sheets (regions of carbon atoms resembling benzene rings connected together). In the pre-graphitic insertion compounds, as the size of the graphene sheets becomes smaller, the compounds become more like those of the network glass model. Thus, the two types of structure may not readily be distinguishable except when the size of the graphene sheets is at a relative extreme. (This situation would parallel the known difficulty in distinguishing the two carbonaceous materials, coke and graphite. Therein, coke continuously becomes more like graphite with an ordering of the carbon atoms within. The point at which coke is no longer coke but graphite appears not to be defined.)

A general method for preparing carbonaceous insertion compounds of the invention involves obtaining a polymeric precursor with an appropriate stoichiometry and pyrolyzing it. The polymeric precursor can evaporate to some extent and lose significant hydrogen in particular in the early stages of any high temperature synthesis step. Oxygen and carbon may also be lost. Thus, the composition of a precursor, denoted as $H_nSi_yC_{1-y}O_{z'}$ may be appropriate in principle if y' is in the range from greater than zero to less than 1, and n and z' are greater than zero.

Pyrolysis is performed at a temperature above the decomposition, for example, an inert atmosphere, temperature of the polymeric precursor and below the minimum of the temperatures for forming SiC or $SiO_2$ from the pyrolyzed precursor. The temperature for such formation may be dependent on the polymeric precursor used and thus varies accordingly. The heating profile can be adjusted to maximize product yield and to control the product stoichiometry.

The pyrolysis should be performed under a controlled atmosphere, for example, an inert atmosphere, to prevent the formation of unwanted oxides of carbon and/or silicon. A suitable reaction system could consist of a reaction tube (quartz for example) installed in a conventional tube furnace wherein the tube has sealed inlet and outlet connections for purposes of controlling the atmosphere therein. The precursor could thus be pyrolyzed in the reaction tube under an inert gas flow or even under reduced pressure.

To ensure good product yields, the polymeric precursor should substantially pyrolyze rather than simply evaporate. It is therefore desirable for the precursor to be a hard infusible plastic. Use of such a precursor would have the additional benefit of facilitating the formation of a disordered structural network upon pyrolysis. A hard infusible plastic might be achieved by mixing various hardeners in with a desired polymer and hardening the mixture before pyrolysis. It may also be desirable to use more than one polymer in such a mixture. For example, the silicon/carbon ratio of the pyrolyzed product might be deliberately varied by varying the mix ratio of a first silicon containing polymer to that of a second polymer containing no silicon.

Polymers comprising epoxy functional groups are particularly able to be cross-linked into a hard infusible plastic. Insertion compounds of the invention can be prepared using hardened blends of 3-glycidoxypropyltrimethoxysilane and epoxy novolac resin in various ratios. These polymers are miscible and both contain epoxy groups, making it possible to cross-link each to itself and to each other.

When desired, hardeners can be selected empirically from commercially available sources. A polymer-hardener mixture should preferably cross-link to a significant extent and do so quickly at relatively low temperatures in order to minimize evaporative loss. (The extent of the cross-linking also can be expected to have some effect on the resulting disordered structure.) The silicon containing polymer, 3-glycidoxypropyltrimethoxysilane, for example is quite volatile. Blends comprising this polymer are therefore preferably hardened before pyrolysis in order to minimize loss of the polymer.

Preferable hardeners for blends of 3-glycidoxypropyltrimethoxysilane and epoxy novolac resin include 4-aminobenzoic acid and hexamethylenediamine. Such polymer-hardener mixtures can cross-link to form a solid at temperatures as low as 90° C. in about an hour when using about 17% by weight of hardener. (In order to achieve a homogenously hardened solid, it is important to ensure that the polymer-hardener mixture is itself homogenous or well mixed.) Other suitable hardeners for the same blend of polymers include phthalic anhydride, m-phenylenediamine, and N-benzylmethylamine. Such polymer-hardener mixtures require higher temperatures and/or longer times before a cross-linked solid is formed. The hardener will also decompose during pyrolysis with the residue being incorporated into the product. Most of the aforementioned hardeners contain nitrogen. Thus, these may be expected to contribute traces of nitrogen in a pyrolyzed product derived therefrom.

It can be desirable to grind the hardened polymer precursor before pyrolysis into a readily dispersible fine powder. Higher product yields have been observed when this additional process step is performed. Grinding also provides an increased surface area which facilitates the release of volatile, low molecular weight hydrogen by-products.

The silicon containing product of the aforementioned process has no alkali metal inserted as prepared. Alkali metal atoms, in particular Li, can be inserted thereafter via chemical or electrochemical means (such as in a lithium or lithium ion battery).

Certain compounds of this invention are attractive for use as electrode materials in batteries. A variety of embodiments are possible. Miniature laboratory batteries employing a lithium metal anode are described in the examples to follow. However, a preferred construction for a lithium ion type product is that depicted for a conventional spiral-wound type battery in the cross-sectional view of FIG. 1. A jelly roll 41 is created by spirally winding a cathode foil (not shown), an anode foil (not shown), and two microporous polyolefin sheets (not shown) that act as separators.

Cathode foils are prepared by applying a mixture of a suitable cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered carbonaceous compound of the invention is used instead of the cathode material and thin copper foil is usually used instead of aluminum. Anode foils are typically slightly wider than the cathode foils in order to ensure that anode foil is always opposite cathode foil. This feature is illustrated with the cathode upper edge 13, cathode lower edge 14, anode upper edge 12, and anode lower edge 15 depicted in FIG. 1.

The jelly roll 4 is inserted into a conventional battery can 3. A header 1 and gasket 10 are used to seal the battery 16. The header may include safety devices if desired. A combination safety vent and pressure operated disconnect device may be employed. FIG. 1 shows one such combination that is described in detail in Canadian Patent Application No. 2,099,657. Additionally, a positive thermal coefficient device (PTC) may be incorporated into the header to limit the short circuit current capability of the battery. The external surface of the header 1 is used as the positive terminal, while the external surface of the can 3 serves as the negative terminal.

Appropriate cathode tab 5 and anode tab 6 connections are made to connect the internal electrodes to the external terminals. Appropriate insulating pieces 2 and 7 may be inserted to prevent the possibility of internal shorting. Prior to crimping the header 1 to the can 3 in order to seal the battery, electrolyte 8 is added to fill the porous spaces in the jelly roll 4.

Those skilled in the art will understand that the types of and amounts of the component materials must be chosen based on component material properties and the desired performance and safety requirements. The compounds prepared in the Examples to follow have been found to have significantly increased irreversible capacity for lithium along with an increased reversible capacity over that of many typical commercial carbonaceous anode materials. This must be taken into account in the battery design. Generally an electrical conditioning step, involving at least the first recharge of the battery, is part of the assembly process. Again, the determination of an appropriate conditioning step along with the setting of the battery operating parameters (eg. voltage, current, and temperature limits) would be required of someone familiar with the field.

Other configurations or components are possible for the batteries of the invention (eg. a prismatic format). A miniature embodiment, eg. coin cell, is also possible and the general construction of such cells is described in the laboratory coin cell examples to follow.

The following examples are provided to illustrate certain aspects of the invention but should not be construed as limiting in any way. Where indicated, powder x-ray diffraction was used to characterize samples. A Seimens D5000 diffractometer equipped with a copper target x-ray tube and a diffracted beam monochromator was used for these experiments. The samples were made by filling a 2 mm deep well in a stainless steel block with powder and levelling the surface. Both the divergence and anti-scatter slits were fixed at 0.5° for all measurements. A typical data set was collected within a 2θ range from 2° to 90° with a step size of 0.1°.

Chemical analyses were performed on the samples as indicated using a variety of methods. The silicon content in these pyrolyzed products was determined using a TA instruments 951 thermal gravimetric analyzer (TGA). About 30 to 50 mg of sample was held by a platinum pan and heated to 900° C. at a rate of 10° C./min in a flow of extra dry air. The final residue produced from the TGA analysis was a white, fluffy powder. The x-ray diffraction pattern of this powder is consistent with that of an amorphous silicon dioxide. (The dioxide is the most stable oxide of silicon under normal conditions. The lower oxide, SiO, can be produced by reacting $SiO_2$ with Si at temperatures above 1250° C. However, SiO disproportionates on slow cooling. Thus, it is very unlikely that SiO has been formed here.) By assuming that the weight loss during heating was due to the complete loss of carbon by the gaseous phase formation of carbon oxides with no loss of silicon and that silicon dioxide is the only residual solid product, the weight percentage of silicon in the sample can be deduced.

The oxygen and carbon content of samples was estimated using a chemical leaching technique. First, the silicon and oxygen components of a sample was removed by reacting a preweighed amount (about 200 mg) with excess concentrated hydrofluoric acid. Then, the excess acid and water in the sample was evaporated away at 110° C. for several hours or overnight until a constant weight was achieved. The whole operation was performed in plastic vials. The following reaction was assumed:

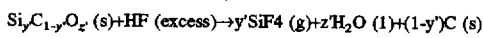

$Si_yC_{1-y'}O_{z'}$ (s) + HF (excess) → y'SiF4 (g) + z'H$_2$O (l) + (1-y')C (s)

The reaction was exothermic and very fast as evidenced by an instant release of a white vapor (probably silicon dioxide smoke resulting from the reaction of SiF$_4$ with moisture) at the moment of the addition of hydrofluoric acid. The subsequent evaporation of excess HF and water gave a dry, pure black carbonaceous mass. When this mass, a black solid residue, was heated to 900° C. in air in the TGA, the weight loss was 100 (±3)% strongly suggesting that the silicon removal process was complete. X-ray diffraction patterns of the black residual mass were also consistent with that of a disordered carbon alone. Thus, the original carbon content was calculated from the weight differences before and after the HF treatment. (The results were duplicated at least once for each sample and the error was estimated from the difference between the two results.) The oxygen content of the sample was then estimated by simply subtracting the amount of silicon (as determined by the TGA technique) and the amount of carbon from the total sample mass. (The presence of small amounts of other elements in the samples, such as nitrogen or hydrogen, was thus ignored in this estimate.)

Carbon, hydrogen, and nitrogen content was also determined using a standard CHN analysis (gas chromatographic analysis after combustion of the samples in air). This analysis has an expected error of ±0.3% by weight.

Finally, scanning Auger electron spectroscopy was performed where indicated using a Perkin Elmer Physical Electronics Division model 595 scanning Auger microscope. Specimens for Auger spectroscopy were prepared by pressing sample powders into an indium metal sheet with a dimension of 1×1 cm$^2$. The sample was put in an evacuated chamber of 10$^{-9}$ torr and sputtered by a 3 KV argon beam for about 10 seconds to remove surface impurities. A kinetic energy region from 30 to 600 eV was scanned using a primary electron energy of 3 KeV. The energy and shape of the first derivative signals for each element of interest was analyzed and compared with the results of H. H. Madden, J. Vac. Sci. Tech. 18, 667 (1981) The energy level for a particular line was determined from the largest negative going peak in the derivative signal. The stoichiometry of a sample was estimated using the relative Auger sensitivity factors and methods described in L. E. Davis et al., Handbook of Auger Electron Spectroscopy, 2nd edition (Physical Electronics Division, Perkin Elmer Corporation, Eden Prarie, Minn.,) (1978).

Figure 2:
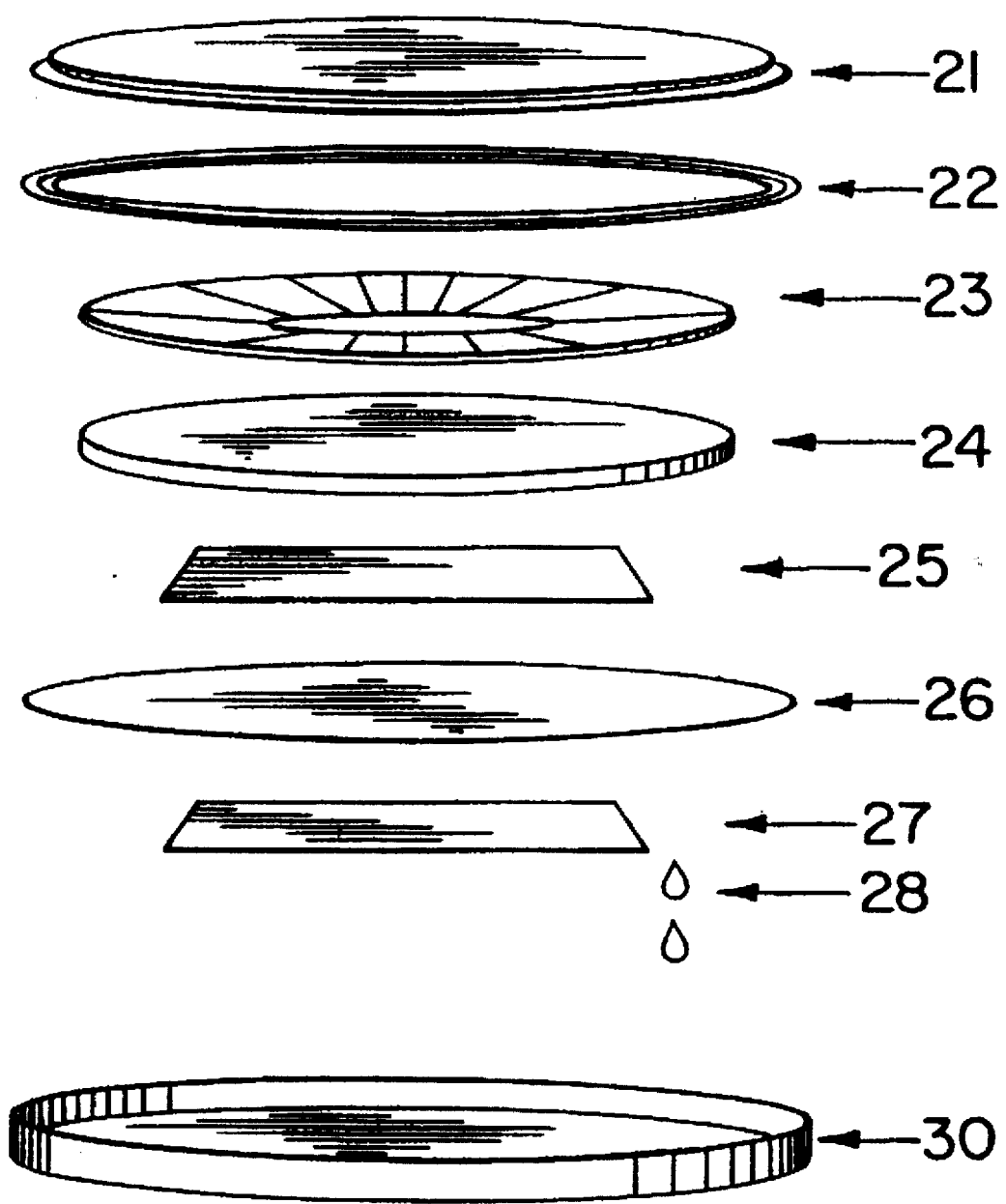
FIG. 2 depicts an exploded view of the laboratory coin cell battery used in the examples.

Laboratory coin cell batteries were used to determine electrochemical characteristics in the Examples. These were assembled using conventional 2325 hardware and with assembly taking place in an argon filled glove box as described in J. R. Dahn et al, Electrochimica Acta, 38, 1179 (1993). FIG. 2 shows an exploded view of the coin cell type battery. For purposes of analysis, the samples were used as cathodes in these batteries opposite a lithium metal anode. A stainless steel cap 21 and special oxidation resistant case 30 comprise the container and also serve as negative and positive terminals respectively. A gasket 22 is used as a seal and also serves to separate the two terminals. Mechanical pressure is applied to the stack comprising lithium anode 25, separator 26, and sample cathode 27 by means of mild steel disc spring 23 and stainless disc 24. The disc spring was selected such that a pressure of about 15 bar was applied following closure of the battery. 125 μm thick metal foil was used as the lithium anode 25. Celgard® 2400 microporous polypropylene film was used as the separator 26. The electrolyte 28 was a solution of 1M LiPF$_6$ salt dissolved in a solvent mixture of ethylene carbonate and diethyl carbonate in a volume ratio of 30/70.

Sample cathodes 27 were made using a mixture of powdered sample compound (−200 mesh size) plus Super S (trademark of Ensagri) carbon black conductive dilutant and polyvinylidene fluoride (PVDF) binder (in amounts of about 5% and 10% by weight respectively to that of the sample) uniformly coated (about 125 micrometers thick, 20 mg/cm$^2$) on thin copper foil. The powdered sample and the carbon black were initially added to a solution of 20% PVDF in N-methylpyrollidinone (NMP) to form a slurry such that 10% of the final electrode mass would be PVDF. Excess NMP was then added until the slurry reached a smooth syrupy viscosity. The slurry was then spread on small preweighed pieces of Cu foil (about 1.5 cm$^2$ in area) using a spreader, and the NMP was evaporated at about 110° C. in air. Once the sample cathode stock was dried, it was compressed between flat plates at about 25 bar pressure. These electrodes were then weighed and the weight of the foil, the PVDF, and the carbon black were subtracted to obtain the active electrode mass.

After construction, the coin cell batteries were removed from the glove box, thermostatted at 30°±1° C., and then charged and discharged using constant current cyclers with ±1% current stability. Data was logged whenever the cell voltage changed by more than 0.005 V. The batteries were discharged first using a constant current of 18.6 mA/g (of sample) until the voltage dropped to −0.005 volt versus lithium metal. Then, the direction of current was reversed and the batteries were charged to 2.5 V. The second discharge of the batteries was allowed to proceed until the plating of metallic lithium on the sample electrode was indicated by the battery voltage. Upon the initiation of plating, the battery voltage rises slightly (even though lithium is still being transferred to the sample electrode). This is due to a small overvoltage associated with the nucleation of metallic Li particles. After the onset of plating, the battery voltage remains constant at about −0.02 V, so that plating is easily distinguished from the insertion of lithium within the sample host. On the subsequent charge, the plated metallic lithium is first stripped and then lithium is removed from the host. These special cycling procedures were adopted because much of the cycling capacity of carbonaceous samples may be near zero volts versus Li.

The irreversible specific capacity (capacity per gram of sample) was taken to be the difference of the specific capacities for the first discharge and charge. The reversible specific capacity was taken as the average of the specific capacities measured during the second discharge and charge, excluding the capacities associated with the plating and stripping of metallic Li. In each case, the reported specific capacities represent averages from two or more batteries. Errors were estimates based on the observed spread between batteries.

For purposes of comparison, example information originally presented in the aforementioned co-pending Canadian patent application, Serial No. 2,127,621, filed Jul. 8, 1994 is given in the following Comparative Example.

INVENTIVE EXAMPLE 1

A series of samples with varying stoichiometry was prepared as follows. DEN 438 epoxy novolac resin (a product of Dow Chemical with MWN605, henceforth abbreviated as ENR) was warmed in a beaker at ~110° C. on a hot plate to reduce viscosity for easy handling. The warmed resin was then mixed with Z-6040 3-glycidoxypropyltrimethoxysilane (a product of Dow Corning, henceforth referred to as 'silane') in a nickel container in different amounts for each sample such that a total weight of 20 g was obtained. The series consisted of samples containing either 0, 20, 40, 60, 80, or 100% 'silane'.

4 grams of hardener was then added to each sample. The hardener used was mainly 4-aminobenzoic acid (ABA), but, in one case, phthalic anhydride (PA) was used. Each sample container was placed in an oven at 90° C. for an hour, and the temperature was then raised to 170° C. The whole hardening process lasted about 3 hours for ABA and overnight for PA. The hardened products were crushed and ground briefly using a grinder. Then, about 3 g of each sample was weighed and placed in a nickel boat for pyrolysis. Several samples at a time were placed in the center zone of a quartz tube. The tube was flushed for about 30 minutes with argon gas (UHP) and then inserted into a horizontal furnace at 100° C. The temperature was then raised to 1000° C. at a rate of 25° C./min., soaked for 1 hour, and furnace-cooled to 100° C. The quartz tube was then removed from the furnace and allowed to cool to room temperature.

Samples were then ground into a fine powder and collected for further characterization and electrochemical testing. It was noticed that the samples made using high 'silane' % had a black glassy appearance.

Table 1 shows a summary of various characteristics of the samples hardened with ABA. Yields, tap density, and results of the various chemical analyses are given therein.

Yields of both carbon and silicon were calculated as the % remaining of each based on the TGA and HF data. The major loss of silicon seemed to occur during the hardening step, even though hardening can be accomplished within a short period of time. The loss is less using lower 'silane' %, presumably because higher proportions of ENR facilitate cross-linking. Little silicon loss appears to have occurred during the subsequent high temperature pyrolysis because the final product showed no sign of melting before pyrolysis took place. The volume of the grains decreased but their general shape was maintained. The sample color was noticed to have changed from yellow to black after pyrolysis. Carbon yield was noticed to vary with starting 'silane' %, increasing at first, but then decreasing. It seems that use of smaller starting 'silane' % (about 20%) improves the carbon yield. As the starting % of 'silane' is increased, the overall number of aromatics in the precursor mixture decreased and so did the carbon yield.

The tap density of these samples was determined by placing a known weight of powdered sample in a 5 ml graduated cylinder, tapping the cylinder 30 times, and measuring the volume occupied by the powder.

Chemical analyses were performed as described in the preceding discussion. The carbon content of the samples as measured by CHN analysis is slightly lower than, but otherwise in good overall agreement with, that determined by the TGA and HF based analyses. (The latter have been corrected for nitrogen content in Table 1 as determined by the CHN analysis.) TGA results indicated that all the silicon-containing samples were hygroscopic. They contain approximately 3.6 to 5.0 weight percent of water, which is evolved in a clear weight loss event near 100° C. in the TGA analysis. On the other hand, there is virtually no water in the pure carbon sample. The TGA results for silicon content have therefore been corrected for the weight of surface water. The nitrogen content appears more or less constant (1.5±0.4 wt %) which is consistent with the fact that a constant amount of ABA was employed in each sample. The hydrogen content given by CEN analysis ranges from 0.4 to 1.04% which is, of course, affected by the surface water on the silicon-containing samples. The $H_{corr}$ data provided in Table 1 have been corrected for the amount of surface water as determined by the TGA analyses. Only a small amount of hydrogen (from 0.2 to 0.5%) is observed after pyrolysis at 1000° C. It was noticed that the oxygen content of the samples was roughly proportional to the silicon content when the starting 'silane' % was greater than about 40%. The oxygen/silicon (O/Si) ratio increases rapidly with silicon concentration and reaches a saturation level of about 1.7. This result suggests that about 1.7 oxygen atoms can bond to each silicon atom in the samples.

Figure 3:
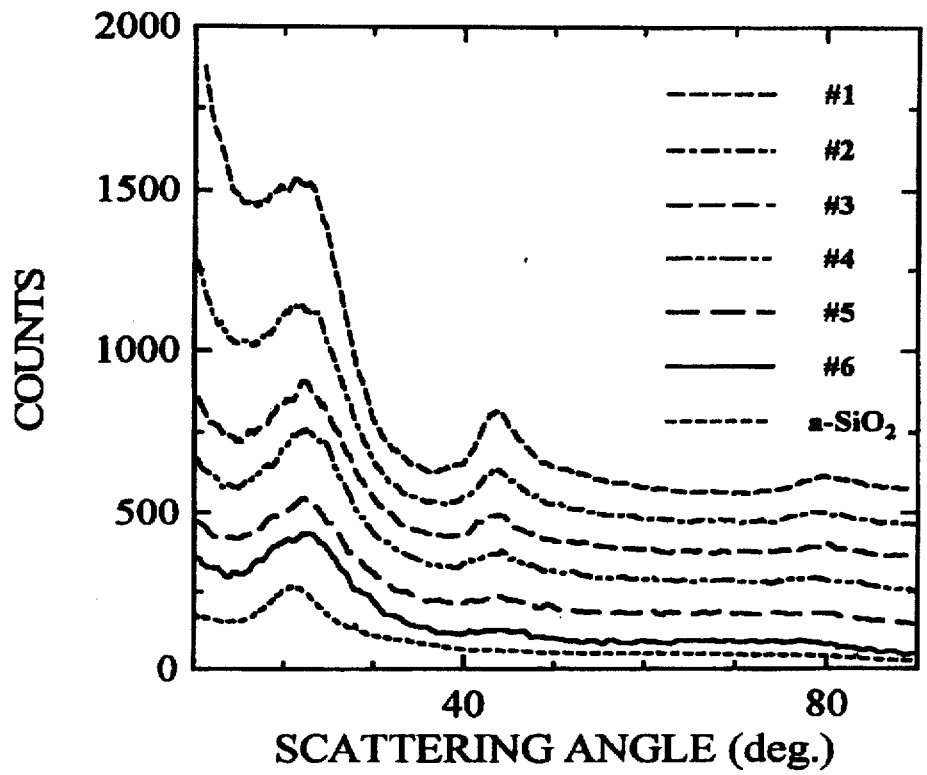
FIG. 3 shows the x-ray diffraction patterns of the samples 1–6 of the Inventive Example and a-$SiO_2$ for reference. The data sets have been offset vertically by 100 counts sequentially for clarity.

The x-ray diffraction patterns of the samples described in Table 1 are shown in FIG. 3. Also included in FIG. 3 is a pattern of amorphous quartz. Sample #1, containing no Si, shows a pattern consistent with that of disordered (or hard) carbon with broad {002}, {100}, and {110} reflections at 2θ angles of 22°, 44° and 80°. The {100} peak is consistent with that expected for small (about 20 Å) graphene sheets, which are either stacked with random rotations or translations between them (known as turbostratic disorder) or are present as single layers. The {002} peak is found on a background which increases steeply at low scattering angle. This background arises from the fact that the majority of the graphene sheets are present as single layers without adjacent parallel neighbors. Thus, the graphene sheets are arranged more or less like a 'house of cards' within each carbon grain. This situation may be expected since products derived from solid state pyrolysis of highly cross-linked polymers usually show turbostratic and angularly displaced aromatic systems which are directly related to their initial reticulated polymer structure.

With increasing starting 'silane' %, two major changes to the x-ray patterns were observed. First, the {100} peak near 44° is diminished indicating that samples prepared from 'silane'-rich precursors are not made up of graphene sheets. Second, the peak near 22° changes its nature and the strong low angle background is reduced. The entire x-ray patterns for samples #4, 5, and 6 closely resemble that of the amorphous quartz specimen.

FIG. 3 thus evidences that compounds #2-#5 have x-ray diffraction pattern intensities between the x-ray diffraction pattern intensities of carbon having a disordered graphite structure and reagent a-SiO$_2$ at about 22° and about 44°.

Figure 4A:
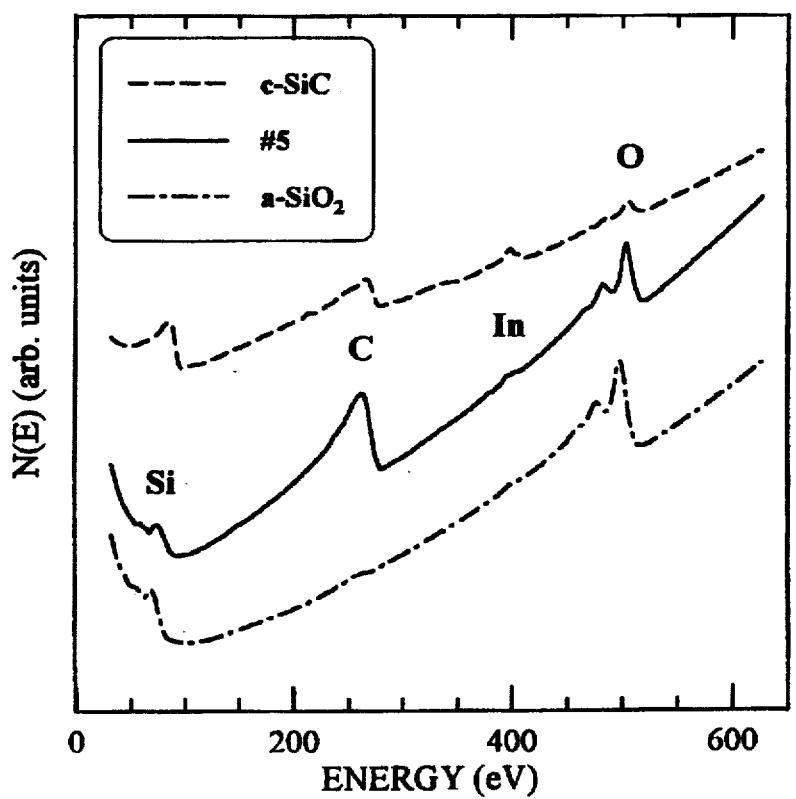
FIGS. 4 a, b, and c show the Auger electron spectra, derivative signal thereof, and an expanded of the derivative signal thereof for Inventive sample 5 and c-SiC and a-$SiO_2$ for reference.
Figure 4B:
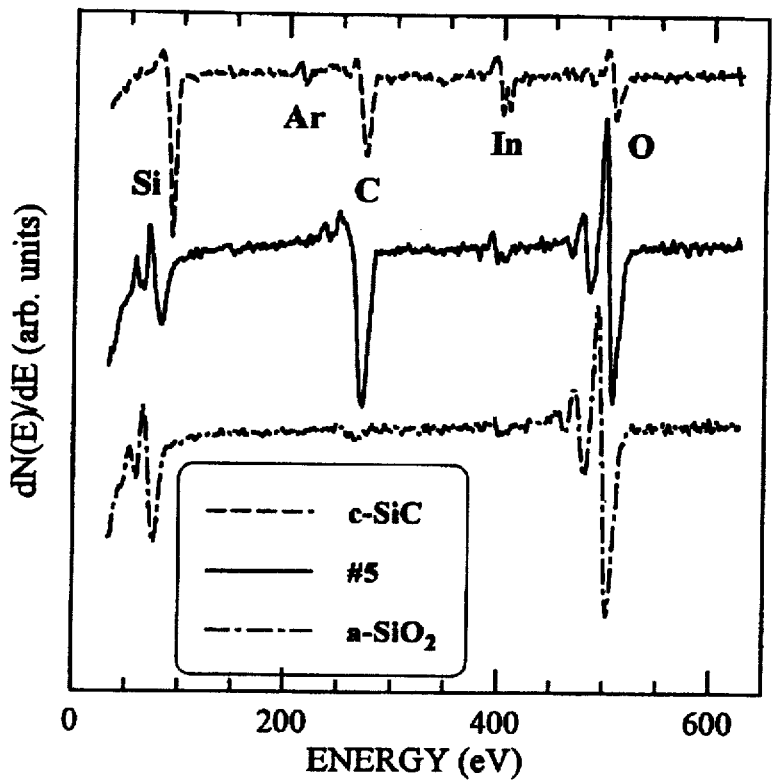

Auger electron spectroscopy was performed as described in the preceding for the following materials: i) sample #5, ii) crystalline silicon carbide (denoted c-SiC) 400 mesh size powder obtained from Aldrich, and iii) amorphous silica (denoted a-SiO$_2$) reagent grade from Fisher Scientific, the latter two being for purposes of comparison. FIGS. 4a and b show Auger electron energy spectra and first derivative signals respectively for each of these. Auger signals near 80 eV have been identified as Si-L$_{23}$VV signals by comparing the shapes and energy positions with literature values. Similarly, carbon-KVV and oxygen-KVV Auger signals near 270 and 507 eV respectively were recognized. The signals at 218 and 412 eV are due to implanted argon and the indium metal substrate respectively. The oxygen evident in the c-SiC spectrum is believed to be predominantly from the indium substrate. (The other samples covered the indium foil better.) The stoichiometry of each sample was determined as mentioned in the preceding. Values obtained were $Si_{0.50}C_{0.50}$ for c-SiC, $Si_{0.38}O_{0.62}$ for a-SiO$_2$, and $Si_{0.22}C_{0.78}O_{0.45}$ for sample #5. The stoichiometries determined in this manner are therefore in reasonably good agreement with those of known compounds and with that of sample #5 as determined by the preceding methods.

TABLE 1

Characteristics of samples of the Inventive Example

| Sample # | 1 | 2 | 3 | 4 | 5 | 6 |
|---|---|---|---|---|---|---|
| Starting 'Silane' % | 0 | 20 | 40 | 60 | 80 | 100 |
| C Yield % | 44 ± 4 | 50 ± 5 | 44 ± 4 | 38 ± 4 | 31 ± 3 | 23 ± 2 |
| Si Yield % | 0 | 67 ± 7 | 57 ± 6 | 47 ± 5 | 35 ± 4 | 23 ± 4 |
| Tap density (g/cc) | 0.59 | 0.85 | 0.87 | 0.88 | 0.90 | 1.04 |
| Si wt % (by TGA) | 0.0 ± 1.4 | 7.7 ± 1.2 | 15.0 ± 1.0 | 20.0 ± 1.3 | 27.0 ± 0.9 | 32.1 ± 1.3 |
| C wt % (by HF) | 96.8 ± 3.0 | 87.4 ± 1.8 | 70.5 ± 1.4 | 58.8 ± 1.2 | 45.0 ± 1.3 | 35.6 ± 1.1 |
| O wt % (by TGA/HF) | 0.0 ± 4.4 | 3.4 ± 3.2 | 13.0 ± 2.5 | 19.7 ± 2.5 | 26.5 ± 3.8 | 30.8 ± 6.7 |
| O/Si ratio | 0.0 ± 0.03 | 0.78 ± 0.35 | 1.52 ± 0.29 | 1.73 ± 0.24 | 1.72 ± 0.25 | 1.69 ± 0.30 |
| Stoichiometry (by TGA/HF) | $Si_0C_1O_0$ | $Si_{0.04}C_{0.96}O_{0.03}$ | $Si_{0.08}C_{0.92}O_{0.103}$ | $Si_{0.13}C_{0.87}O_{0.22}$ | $Si_{0.20}C_{0.80}O_{0.35}$ | $Si_{0.28}C_{0.72}O_{0.47}$ |
| C wt % (by CHN) | 92.4 ± 2.8 | 76.5 ± 1.9 | 64.6 ± 1.5 | 52.1 ± 1.3 | 37.2 ± 0.1 | 37.7 ± 0.1 |
| H wt % (by CHN) | 0.40 ± 0.01 | 0.61 ± 0.02 | 0.63 ± 0.05 | 0.81 ± 0.02 | 1.00 ± 0.03 | 1.04 ± 0.11 |
| N wt % (by CHN) | 1.47 ± 0.04 | 1.50 ± 0.04 | 1.63 ± 0.02 | 1.49 ± 0.04 | 1.44 ± 0.15 | 1.51 ± 0.07 |
| $H_{corr}$ wt % | 0.40 ± 0.01 | 0.21 ± 0.02 | 0.23 ± 0.05 | 0.25 ± 0.02 | 0.44 ± 0.03 | 0.48 ± 0.11 |

Figure 4C:
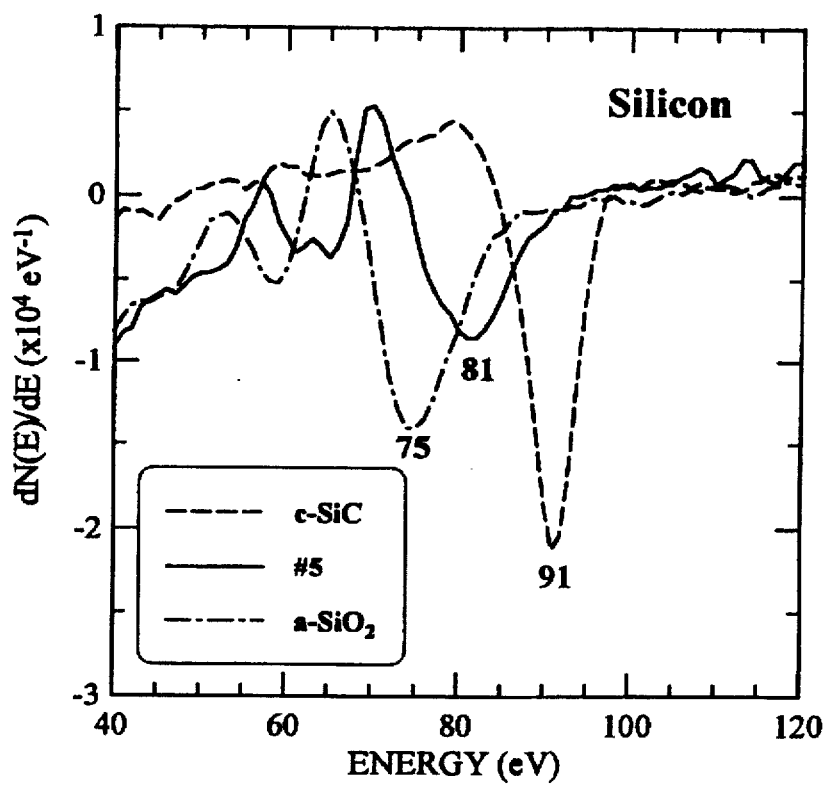

The chemical environment of the silicon in sample #5 was determined by examining the position of the $Si-L_{23}VV$ Auger line. FIG. 4c shows an expanded view of the derivative Auger signal in the region of the Si line. The Auger signal for sample #5 is intermediate to the signals from c-SiC and $a-SiO_2$, suggesting that the Si atoms are bonded to roughly equal numbers of carbon and oxygen atoms.

Figure 5:
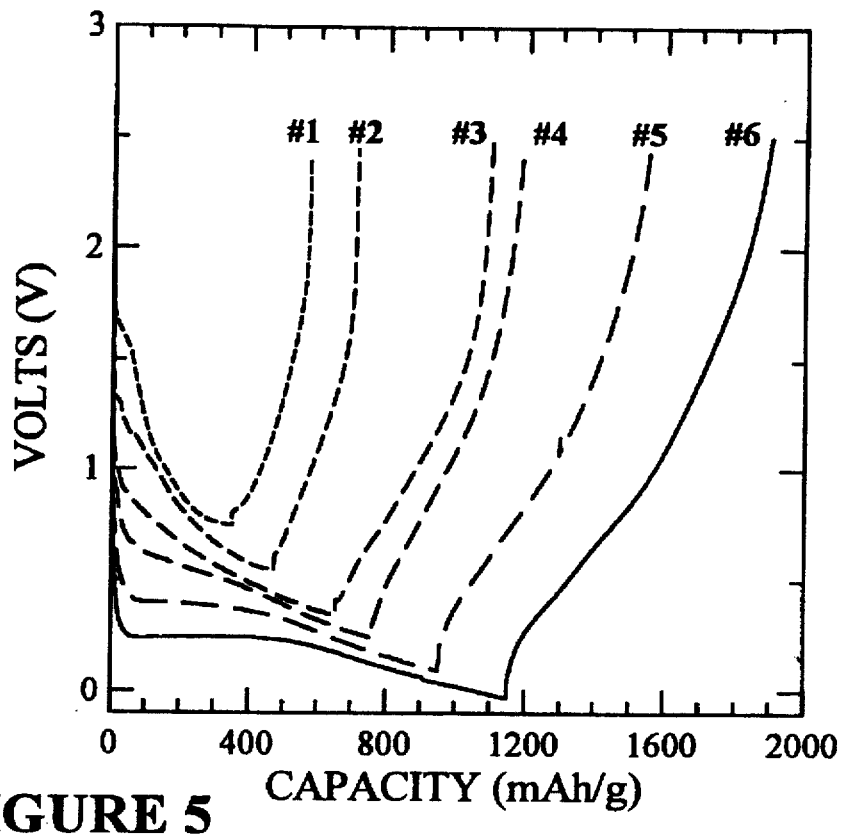
FIG. 5 shows the first cycle voltage profile of the batteries of the Inventive Example. The data have been offset sequentially for clarity. (The shifts are 0.75 V, 0.55 V, 0.35 V, 0.25 V, 0.1 V, and 0.0 V for samples #1 to 6 respectively.)

Electrochemical testing was performed in laboratory batteries as described above. FIG. 5 shows the voltage profiles for the first discharge/charge cycle of batteries made with the six samples described in Table 1. As the silicon concentration increases, a plateau near 0.25 V develops in the discharge curves and its length grows as the concentration of silicon increases. The first charge capacity and the irreversible capacity both increase as the silicon and oxygen contents increase.

Figure 6:
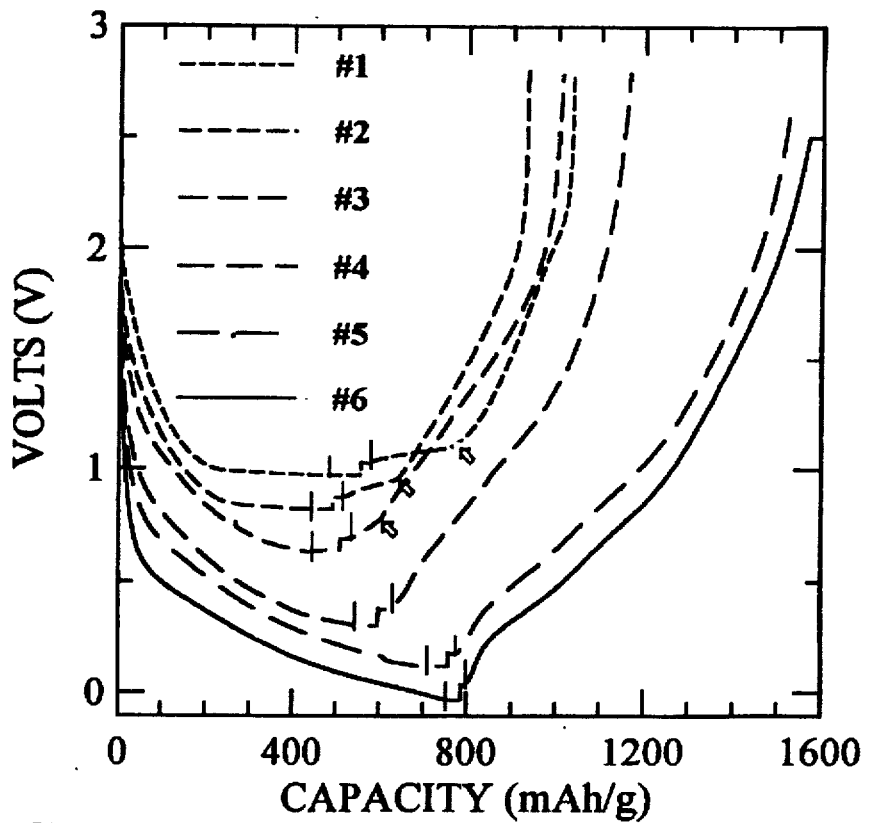
FIG. 6 shows the second cycle voltage profiles of the batteries of the Inventive Example. The vertical lines in this Figure indicate the end points of lithium insertion (the beginning of lithium plating) and the termination of lithium stripping (the beginning of removal of lithium from the host during charge). The arrows mark the break point between regions 1 and 2 as described later in the specification. The voltage data have been offset sequentially for clarity. (The shifts are 1.0 V, 0.85 V, 0.65 V, 0.35 V, 0.15 V, and 0.0 V respectively for samples #1 to 6.)

FIG. 6 shows the second cycle of the same batteries. The onset of plating and the completion of stripping are indicated by vertical lines. Table 2 summarizes the capacity results for all batteries tested (includes sample #2a wherein PA was used as the hardener). The voltage profiles for the second discharge of samples #3, 4, 5, and 6 differ significantly from the corresponding first discharge. The first and second discharges for the sample #1 battery are similar, apart from the fact that the lower voltage cutoff during the first discharge was not low enough to access the low voltage plateau which occurs just above the potential for lithium stripping.

Figure 7A:
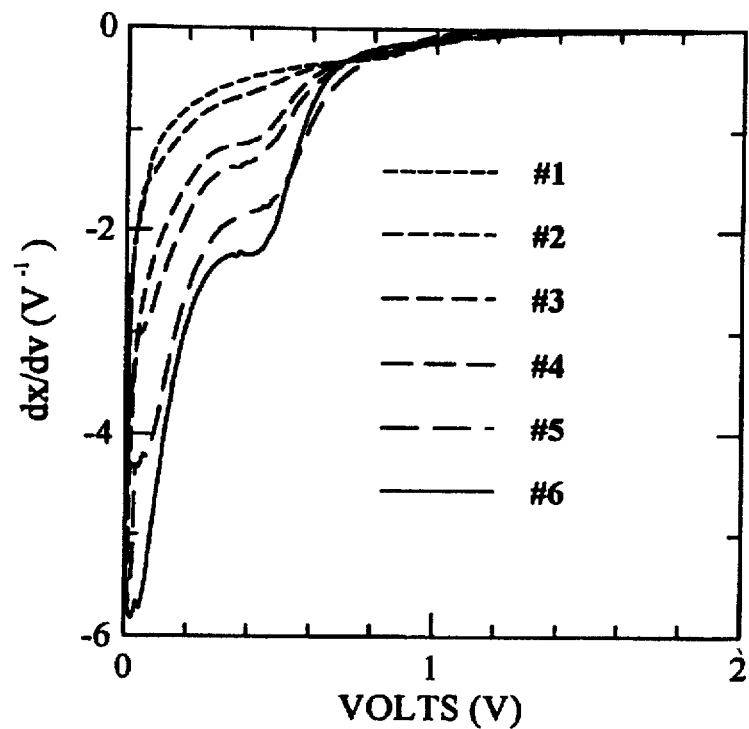
FIGS. 7a and b show the differential capacity versus battery voltage for the second discharge and second charge respectively for batteries of the Inventive Example. The charge data has been multiplied by −1 for easy comparison.
Figure 7B:
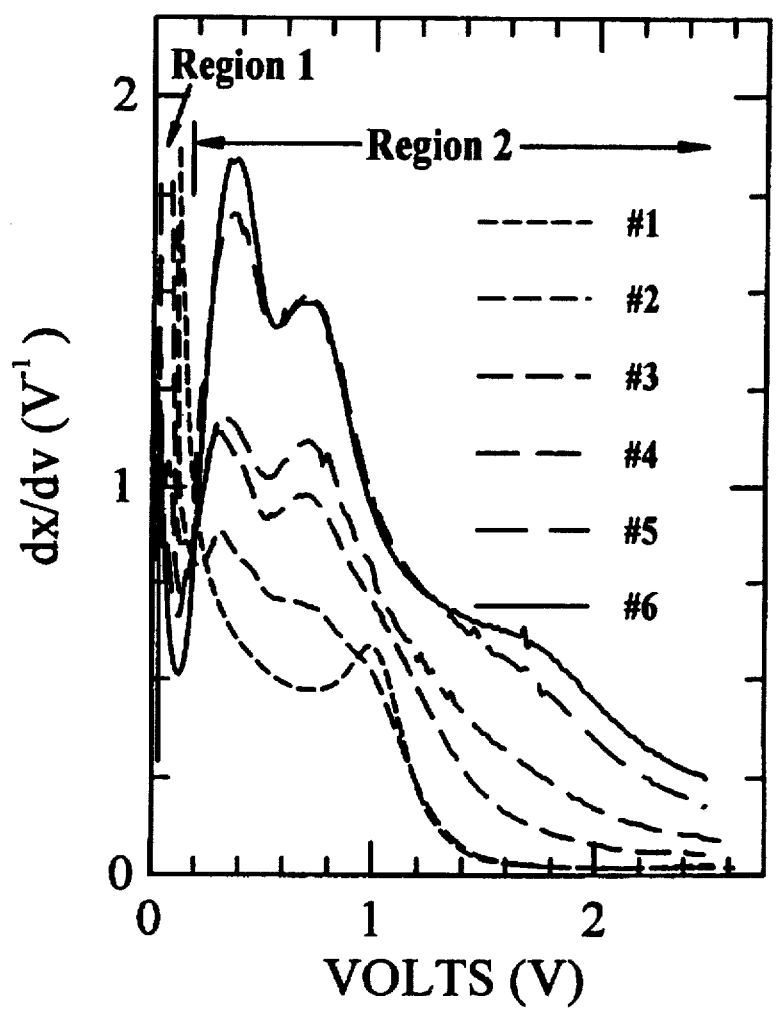
FIG. 7c shows an expanded view of FIG. 7b. The portions of the data corresponding to capacity associated with lithium stripping and from region 1 have been marked.
Figure 7C:
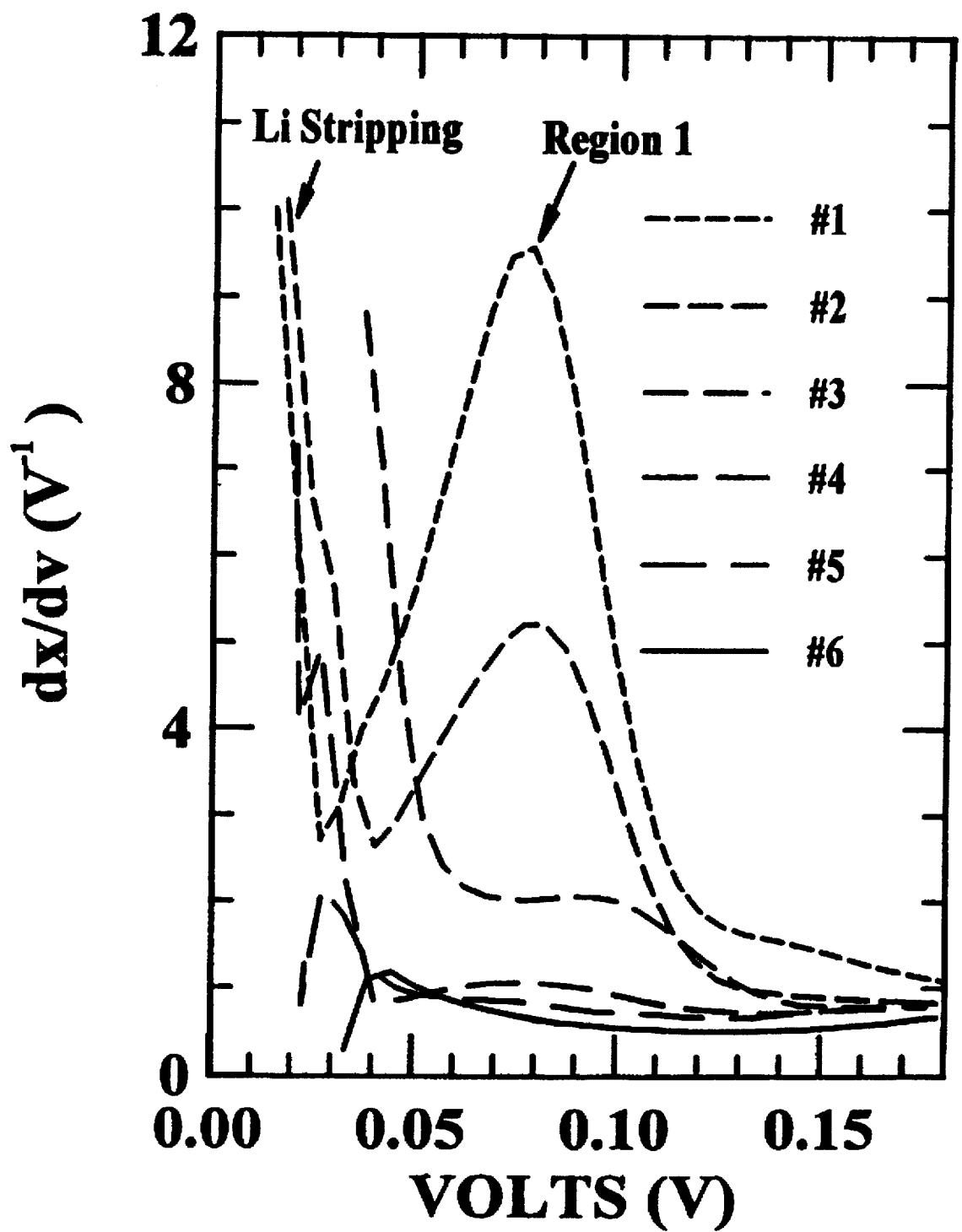

The differences between the samples can be most clearly seen by considering the voltage profiles of the second charge in FIG. 6. Sample #1 shows a substantial low voltage plateau near 0.07 V having a capacity near 240 mAh/g. This plateau is about half as large in sample #2 and is virtually eliminated for sample #3. Simultaneously, the voltage profiles develop significant capacity above 1 volt as the silicon and oxygen concentrations increase. FIGS. 7a and b show respectively the differential capacity for the second discharge and charge of the same set of batteries. The differential capacity values become very large near zero volts for samples #1, 2, and 3 and are beyond the limits of the vertical scale of the graphs. FIG. 7c shows an expanded view of FIG. 7b near zero volts to illustrate the changes in the low voltage (near 0.07 V) plateau with sample composition.

Figure 8:
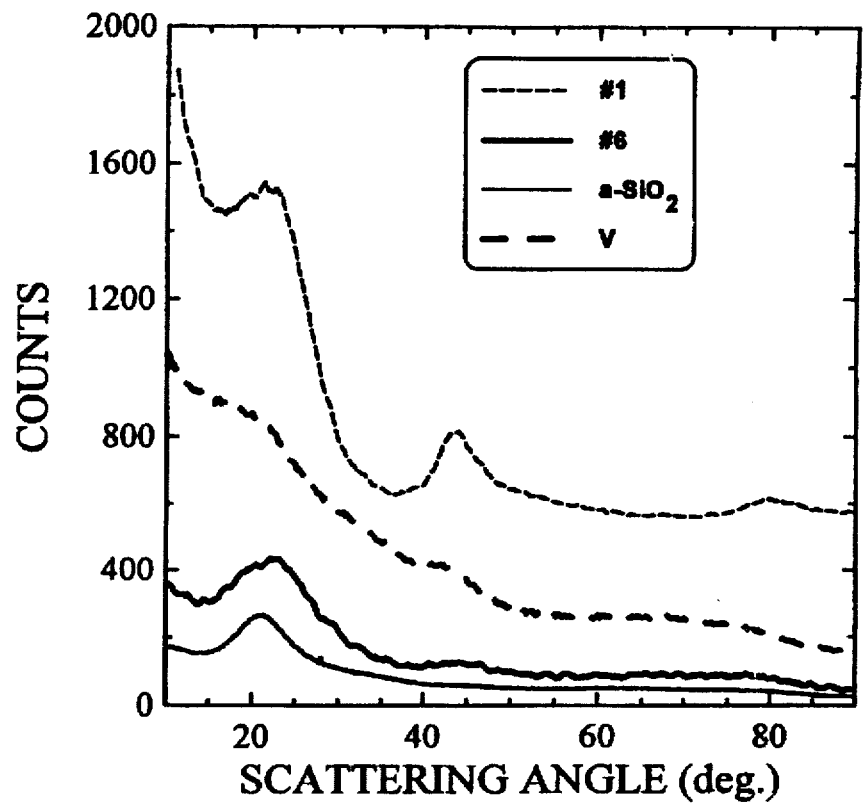
FIG. 8 shows the x-ray patterns of the Comparative Example.

The voltage profiles in FIG. 6 and their derivatives in FIGS. 7a, b, and c can be divided into two regions; a low voltage region called region 1, corresponding to the plateau for samples #1 and #2 in FIG. 6 near 0.07 V and a high voltage region called region 2. The arrows in FIG. 6 show the demarcation between the two regions. Regions 1 and 2 are also labeled in FIGS. 7b and c. FIG. 8 shows the capacity of regions 1 and 2 plotted versus silicon content for the seven samples in Table 2. A close examination of FIGS. 7b and c suggests that the differential capacity for samples #2 and #3 could be constructed from a linear combination of the differential capacities of samples #1 and #4. Additionally, a close examination of FIG. 3 suggests the x-ray diffraction patterns for samples #2 and #3 could be constructed from a linear combination of the patterns of samples #1 and #4. Thus, samples #2 and 3 may be mixed phases, formed partly of a carbon phase and partly of a phase of a silicon-carbon-oxygen glassy compound.

TABLE 2

Specific capacities for the batteries of the Inventive Example.

| Sample # | Irreversible Capacity (mAh/g) | Reversible Capacity (mAh/g) | Region 1 capacity (mAh/g) | Region 2 Capacity (mAh/g) |
|---|---|---|---|---|
| 1 | 151 ± 35 | 505 ± 58 | 238 ± 57 | 267 ± 56 |
| 2 | 229 ± 55 | 442 ± 49 | 126 ± 42 | 316 ± 83 |
| 2a | 263 ± 52 | 421 ± 52 | 40 ± 52 | 381 ± 52 |
| 3 | 246 ± 58 | 455 ± 88 | 59 ± 51 | 386 ± 72 |
| 4 | 338 ± 60 | 541 ± 69 | 0 | 541 ± 69 |
| 5 | 345 ± 59 | 728 ± 77 | 0 | 728 ± 77 |
| 6 | 428 ± 75 | 767 ± 64 | 0 | 767 ± 64 |

Insertion compounds of the invention have been prepared with varying Si-C-O stoichiometry (up to y values less than about 0.3) and small amounts of residual H and N. The compounds have high reversible capacity for lithium and have relatively high tap density. Some of the samples appear to be a mixture of a pre-graphitic carbon and an insertion compound of the invention.

COMPARATIVE EXAMPLE 1

Data for samples V and VI in the Examples of the aforementioned Canadian patent application serial No. 2,127,621 has been imported for purposes of comparison to samples #5 and 6 of the Inventive Example above. The stoichiometries are:

| Sample | Structure | Si—C—O Stoichiometry |
|--------|-----------|----------------------|
| V | Pre-graphitic | $Si_{0.26}C_{0.74}O_{0.26}$ |
| VI | Pre-graphitic | $Si_{0.21}C_{0.79}O_{0.32}$ |
| 5 | Black glass | $Si_{0.20}C_{0.80}O_{0.35}$ |
| 6 | Black glass | $Si_{0.28}C_{0.72}O_{0.47}$ |

Samples V and VI have almost identical x-ray diffraction patterns. Samples #5 and 6 have almost identical x-ray diffraction patterns. However, the x-ray diffraction patterns of samples V and VI are quite different from those of samples 5 and 6. FIG. 8 shows a comparison of the patterns of samples V and 6 along with patterns of a-$SiO_2$ and sample 1 (a pre-graphitic carbon) for reference. Note therefore that there is a structural difference between samples VI and 5 even though the stoichiometries are almost the same.

Figure 9:
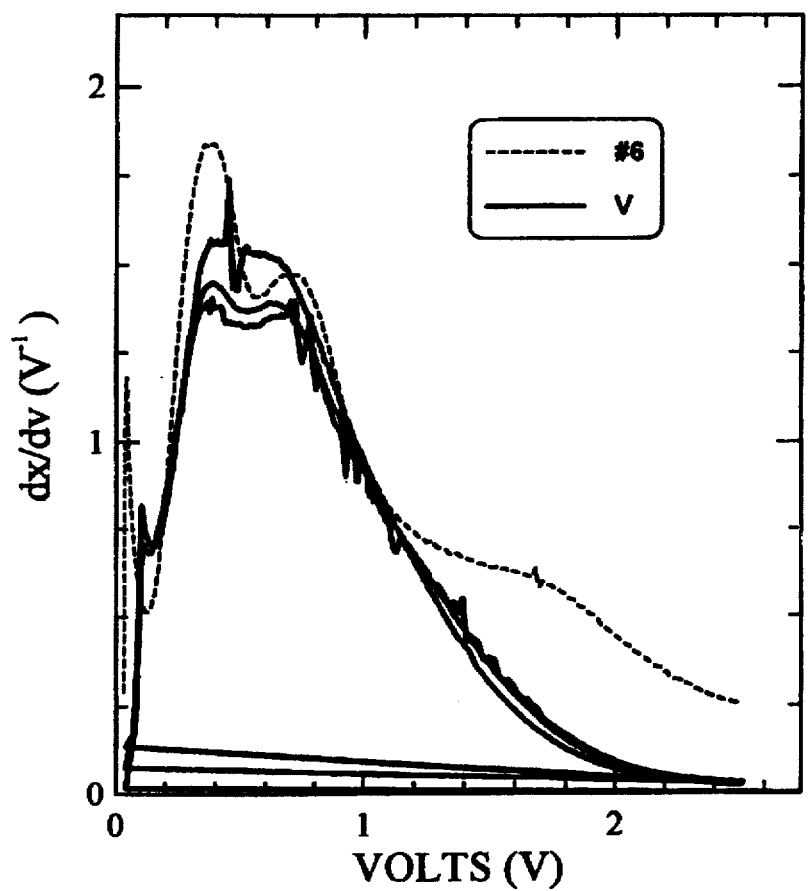
FIG. 9 shows the differential capacity versus voltage curves of the Comparative Example.

A subtle difference in the shape of the voltage versus capacity curves is also evident between samples V and 6. The latter exhibits significant capacity at high voltage (above 1 volt) that is absent in the former. This difference is more easily seen in the differential capacity versus voltage curves shown in FIG. 9.

The instant insertion compounds are different to some extent from those of the 2,127,621 application.

ILLUSTRATIVE EXAMPLE

Conventional hardeners for epoxy polymers such as those employed in the Inventive Example include various anhydrides, amines, and acids. The loss of 'silane' was serious in preliminary syntheses using phthalic anhydride as the hardener (ie. sample #2a). A white vapor was visible at the initial stage of hardening process. To select a more suitable hardener, thirteen different candidates were carefully tested in the following manner. About 50 mg of each hardener was mixed with 250 mg of 'silane' in aluminum pans which were then placed in a preheated oven in air at 90° C. After about one hour, samples were removed from the oven for examination. Those samples showing a fluid state were put back into the oven and the temperature was raised to 170° C. All the samples were then solidified after one hour. Table 3 presents the visual observations of the products from the various hardeners at the two temperatures used as well as the yield (the weight ratio of the final versus the initial 'silane'-hardener mixture).

TABLE 3

Results using the various 'silane'-hardener mixtures of the Illustrative Example.

| Hardener | 90° C. | 170° C. | Yield |
|----------|--------|---------|-------|
| 1,8-naphthalic anhydride | yellow paste | solid | 0.25 |
| nadic methyl anhydride | liquid | light colored solid | 0.10 |
| phthalic anhydride | viscous liquid | good quality solid | 0.47 |
| acetic anhydride | liquid | evaporated | 0 |
| hexamethylenediamine | white solid | N/A | 0.81 |
| m-phenylenediamine | dark brown liquid | dark brown solid | 0.48 |
| 2-naphthylamine | liquid | brown solid | 0.16 |
| dibenzylamine | liquid | brown solid | 0.25 |
| N-benzylmethylamine | viscous liquid | good quality brown solid | 0.57 |
| triethylamine | liquid | evaporated | 0.01 |
| triallylamine | liquid | evaporated | 0.07 |
| 4-aminobenzoic | yellow solid | N/A | 0.74 |
| 11-aminoundecanoic | brown paste | brown solid | 0.28 |

Table 3 shows that 4-aminobenzoic acid and hexamethylenediamine produced a solid after 1 hour at 90° C. and thus appear to be preferred hardeners. Phthalic anhydride, m-phenylenediamine and N-benzylmethylamine may also be suitable since they provided solids with relatively high yield at 170° C.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A glass carbonaceous insertion compound having the formula $A_xSi_yC_{1-y}O_z$ wherein:

(a) A is an alkali metal inserted in the $A_xSi_yC_{1-y}O_z$;

(b) x, y, and z are numbers wherein x is greater than zero, y is in the range from greater than zero to less than 1, and the ratio z/y is greater than zero and less than about 4; and (c) the Cu kα X-ray diffraction pattern intensity of the insertion compound is between the X-ray diffraction pattern intensities of carbon having a disordered graphite structure and reagent a-$SiO_2$, at about 22° and at about 44°.

2. A carbonaceous insertion compound as claimed in claim 1 wherein A is Li.

3. A carbonaceous insertion compound as claimed in claim 1 wherein y is less than about 0.3.

4. A carbonaceous insertion compound as claimed in claim 1 wherein y is greater than about 0.2.

5. A carbonaceous insertion compound as claimed in claim 1 wherein the ratio y/z is about 1.7.

6. A process for preparing a carbonaceous insertion compound having the formula $A_xSi_yC_{1-y}O_z$ wherein A is an alkali metal and x,y, and z are numbers, x being greater than zero, y being in the range from greater than zero to less than 1, and z being greater than zero, comprising:

(a) providing a polymeric precursor for pyrolysis, the precursor having the formula $H_nSi_{y'}C_{1-y'}O_{z'}$, wherein n, y', and z' are numbers, y' is in the range from greater than zero to less than 1, and n and z' are greater than zero;

(b) pyrolyzing the polymeric precursor at a temperature above the decomposition temperature of the precursor and below the minimum of the temperatures for forming SiC or $SiO_2$ from the pyrolyzed polymeric precursor; and (c) inserting atoms of A into the pyrolyzed polymeric precursor.

7. A process as claimed in claim 6 wherein the polymeric precursor comprises a mixture of a first silicon containing polymer and a hardener, the process additionally comprising hardening the polymeric precursor before pyrolyzing.

8. A process as claimed in claim 7 wherein the mixture additionally comprises a second polymer.

9. A process as claimed in claim 8 wherein the first and second polymers comprise epoxy functional groups.

10. A process as claimed in claim 9 wherein the first silicon containing polymer is 3-glycidoxypropyltrimethoxysilane and the second polymer is epoxy novolac resin.

11. A process as claimed in claim 10 wherein the polymeric precursor comprises about 17% by weight of the hardener.

12. A process as claimed in claim 10 wherein the hardener is selected from the group consisting of 4-aminobenzoic acid and hexamethylenediamine.

13. A process as claimed in claim 10 wherein the hardener is selected from the group consisting of phthalic anhydride, m-phenylendiamine, and N-benzylmethylamine.

14. A process as claimed in claim 12 wherein the hardening is performed at a temperature about 90° C. for about an hour and then at a temperature about 170° C. for about two hours.

15. A process as claimed in claim 13 wherein the hardening is performed at a temperature about 90° C. for about an hour and then at a temperature about 170° C. for about twenty hours.

16. A process as claimed in claim 10 wherein the pyrolysis is performed at a temperature about 1000° C. for about one hour.

17. A process as claimed in claim 7 additionally comprising grinding the hardened polymer precursor before the pyrolyzing.

18. A carbonaceous insertion compound prepared by the process as claimed in claim 6.

19. A carbonaceous insertion compound as claimed in claim 18 wherein the energy level of the $Si-L_{23}VV$ Auger line of the pyrolyzed polymeric precursor is intermediate between 75 and 91 eV.

20. A carbonaceous insertion compound as claimed in claim 19 wherein the energy level of the $Si-L_{23}VV$ Auger line of the pyrolyzed polymeric precursor is about 81 eV.

21. A carbonaceous insertion compound prepared by the process as claimed in claim 7.

22. A carbonaceous insertion compound prepared by the process as claimed in claim 10.

23. An electrochemical device comprising an electrode wherein a portion of the electrode comprises the carbonaceous insertion compound as claimed in claim 1, 2, 4, 18, 21, or 22.

24. A battery comprising an electrode wherein a portion of the electrode comprises the carbonaceous insertion compound as claimed in claim 1, 2, 4, 18, 21, or 22.

25. A non-aqueous battery comprising:
a cathode comprising a lithium insertion compound;
a non-aqueous electrolyte comprising a lithium salt dissolved in a mixture of non-aqueous solvents; and
an anode comprising the carbonaceous insertion compound as claimed in claim 1, 4, 18, 21, or 22 wherein the alkali metal A is Li.

26. A method of operating an electrochemical device comprising an electrode, wherein a portion of the electrode comprises a glass carbonaceous insertion compound having the formula $A_xSi_yC_{1-y}O_z$ wherein:
(a) A is an alkali metal inserted in the $A_xSi_yC_{1-y}O_z$;
(b) x, y and z are numbers wherein x is greater than 0, y is in the range from greater than 0 to less than 1, and the ratio z/y is greater than 0 and less than about 4; and
(c) the Cu kα X-ray diffraction pattern intensity of the insertion compound is between the X-ray diffraction pattern intensities of carbon having a disordered graphite structure and reagent $a-SiO_2$ at about 22° and at about 44°;
wherein said method includes the step of:
repeatedly electrochemically reversibly inserting atoms of said alkali metal into said carbonaceous insertion compound in an amount effective to provide a reversible specific capacity for said electrochemical device greater than 372 mAh per gram of said carbonaceous insertion compound.

27. A method as claimed in claim 26, wherein said alkali metal is Li.

28. A method as claimed in claim 26, wherein said carbonaceous insertion compound is prepared by a method comprising the steps of:
(a) providing a polymeric precursor for pyrolysis, the precursor having the formula $H_n Si_{y'} C_{1-y'}O_{z'}$ wherein n, y' and z' are numbers, y' is in a range from greater than 0 to less than 1, and n and z' are greater than 0;
(b) pyrolyzing the polymeric precursor at a temperature above the decomposition temperature of the precursor and below the minimum of the temperatures for forming the SiC or $SiO_2$ from the pyrolyzed polymeric precursor; and
(c) inserting atoms of A into the pyrolyzed polymeric precursor.

29. The method as claimed in claim 28, wherein the polymeric precursor comprises a mixture of a first silicone containing polymer and a hardener, the process additionally comprising hardening the polymeric precursor before pyrolyzing.

30. A method as claimed in claim 29, wherein the mixture additionally comprises a second polymer.

31. A method as claimed in claim 30, wherein the first and second polymers comprise epoxy functional groups.

32. A method as claimed in claim 31, wherein the first silicone containing polymer is 3-glycidoxypropyltrimethoxysilane and the second polymer is epoxy novolac resin.

33. A method as claimed in claim 32, wherein the polymeric precursor comprises about 17% by weight of the hardener.

34. A method as claimed in claim 32, wherein the hardener is selected from the group consisting of 4-aminobenzoic acid and hexamethylenediamine.

35. A process as claimed in claim 32, wherein the hardener is selected from the group consisting of phthalic anhydride, m-phenylenediamine and N-benzylmethylamine.

36. A method as claimed in claim 34, wherein the hardening is performed at a temperature of about 90° C. for about an hour and then at a temperature of about 100° C. for about 2 hours.

37. A method as claimed in claim 35, wherein the hardening is performed at a temperature of about 90° C. for about an hour and then at a temperature of about 170° C. for about 20 hours.

38. A method as claimed in claim 32, wherein the pyrolysis is performed at a temperature of about 1000° C. for about 1 hour.

39. A method as claimed in claim 29, additionally comprising grinding the hardened polymeric precursor before the pyrolyzing.

* * * * *

UNITED STATES PATENT AND TRADEMARK OFFICE
CERTIFICATE OF CORRECTION

PATENT NO. : 5,698,340

DATED : December 16, 1997

INVENTOR(S) : Xue et al.

It is certified that error appears in the above-identified patent and that said Letters Patent is hereby corrected as shown below:

Column 2, line 51, "$Li_xSi_yC_{1-y}O_n$" should read -- $Li_xSi_yC_{1-y}O_zH_n$ --.

Column 7, line 31, "roll 41" should read --roll 4--.

Column 10, line 61, "MWN605" should read --MW~605--.

Column 11, line 64, "CEN" should read --CHN--.

Signed and Sealed this

Twenty-fourth Day of March, 1998

Attest:

BRUCE LEHMAN

*Attesting Officer*   *Commissioner of Patents and Trademarks*